3,098,090
STABLE LEAD ALKYL COMPOSITIONS AND A METHOD FOR PREPARING THE SAME

Wilford H. Thomas and Shirl E. Cook, Baton Rouge, La., assignors to Ethyl Corporation, New York, N.Y., a corporation of Virginia
No Drawing. Filed June 8, 1962, Ser. No. 200,936
7 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperatures thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C., the decomposition rate increases logarithmically so that a point is soon reached where external heat is no longer required and decomposition becomes selfpropagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz., separation, purification, blending, transportation, and storage—the likelihood of excessive thermal decomposition must be provided for and effectively combatted.

An object of this invention is to stabilize alkyllead compounds against thermal decomposition during one or more of the following operations: separation, purification, blending, transportation and storage.

The above and other objects of this invention are accomplished by incorporating with alkyllead compounds a relatively small quantity of a mixture of materials which has the property of synergistically inhibiting alkyllead thermal decomposition. The foregoing objects are also accomplished by conducting one or more of the foregoing operations in the presence of such a mixture of materials. The mixtures which have been found to possess these unexpected properties are referred to hereinafter as "thermal stabilizers."

The synergistic thermal stabilizer mixtures of this invention are composed of certain mixtures of acyclic hydrocarbons. In particular, these mixtures consist essentially of a $C_8$ acyclic alkane or $C_8$ acyclic alkene hydrocarbon admixed with a $C_{10}$ acyclic alkane or $C_{10}$ acyclic alkene hydrocarbon. The concentrations in which these ingredients are used are equivalent to from about 5 to about 25 percent by weight of the $C_8$ hydrocarbon and from about 5 to about 25 percent by weight of the $C_{10}$ hydrocarbon, each percentage being based on the weight of the alkyllead compound being stabilized. These thermal stabilizer mixtures when used in the foregoing amounts are effective in substantially retarding or preventing thermal decomposition of the alkyllead compound at temperatures ranging from about 100° C. up to about 195° C. for extended periods of time. Moreover, the behavior of these combinations of additives is synergistic, i.e., the thermal stabilization effectiveness of the whole is greater than the sum total of its parts.

As above stated, the thermal stabilizers of this invention consist essentially of a mixture of two acyclic hydrocarbons, viz., a $C_8$ alkane or alkene plus a $C_{10}$ alkane or alkene. It is preferable that at least one of these hydrocarbons be a straight chain (i.e., unbranched) hydrocarbon.

Examples of acyclic $C_8$ alkanes include n-octane; 2-methylheptane; 2,5-dimethylhexane; 3-ethylhexane and 2,2,4-trimethylpentane. Examples of the $C_8$ alkenes include octene-1; octene-2; 4-methylheptene-2; 4-ethylhexene-2 and 4-methyl-4-ethylpentene-2. Examples of the $C_{10}$ alkanes include n-decane; 3-ethyloctane; 2,5-diethylhexane; 2,4,6-trimethylheptane and 3-propylheptane. Examples of the $C_{10}$ alkenes include decene-2; 3-methyl nonene-1; 4-butyl hexene-2; 3-methyl-4-propyl hexene-2 and 3,3,4,4-tetramethylhexene-1. The foregoing mixtures of $C_8$ plus $C_{10}$ acyclic alkanes and/or alkenes are effective even diluted with other hydrocarbons such as paraffins and cycloparaffins.

The chief thermal decomposition products of alkyllead compounds are lead metal and hydrocarbon gas. Hence, a very good index of alkyllead thermal decomposition is liberation of this gas.

To illustrate the effectiveness of this invention, a series of direct comparisons were made of the decomposition characteristics of unstabilized and stabilized tetraethyllead samples. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 195° C., the sample-containing tube was quickly immersed in the bath and clamped with the levelling bottle adjusted to hold the gas buret in place at a zero reading. Then measured was the time during which the sample was held at 195° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred almost immediately as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

The remainder of the compositions tested in the manner described above and the results thereby obtained are shown in the following table.

TABLE

*Effect of Additives on Thermal Decomposition of Alkyllead Compounds at 195° C.*

| Ex. | Run No. | Additive Complement [1] | Thermal Stability Time to Decomposition, Min. |
|---|---|---|---|
| I | 1 | 2,2,4-trimethylpentane (5)+n-decane (5) | 5 |
|   | 2 | 2,2,4-trimethylpentane (15) | <1 |
|   | 3 | n-decane (15) | <1 |
| II | 1 | 2-ethyl hexene-1 (15) + decene-1 (10) | 30 |
|    | 2 | 2-ethyl hexene-1 (15) | 4 |
|    | 3 | decene-1 (15) | 11 |

[1] Numbers in parentheses following the ingredient designate the concentration thereof in terms of weight percentage based upon the weight of the tetraethyllead.

It will be noted that the compositions of this invention exhibited synergistic effectiveness.

The above-described beneficial behavior of the thermal stabilizer mixtures of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizer combinations may be added in appropriate quantity to the alkyllead reaction concentrate just before the separation step which is conducted at a temperature close to the temperature where hazardous run-away decomposition is particularly prevalent. By adding one of the above thermal stabilizer combinations to the reaction concentrate just prior to distillation, the danger arising from unexpected temperature increases is substantially eliminated.

Most preferably the above thermal stabilizer combinations are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer mixture to the alkyllead compound will economically and satisfactorily eliminate most of the hazard involved. While meticulous temperature control and exacting safety measures have been successful in reducing to a minimum the hazards of processing and handling of tetraethyllead, the use of this invention, provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example, tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention. This invention is particularly well suited to the stabilization of any mixture involving two or more of the following compounds: tetramethyllead, ethyltrimethyllead, diethyldimethyllead, triethylmethyllead, and tetraethyllead.

We claim:

1. A method of inhibiting the decomposition of an alkyllead compound at temperatures of from about 100° C. to about 195° C. which comprises incorporating with said compound from about 5 to about 25 weight percent each of a $C_8$ acyclic hydrocarbon selected from the group consisting of alkanes and alkenes, and of a $C_{10}$ acyclic hydrocarbon selected from the group consisting of alkanes and alkenes, the foregoing percentages being based upon the weight of said alkyllead compound.

2. In the process of producing an alkyllead compound by reacting a sodium lead alloy with alkyl chloride and separating the thus produced alkyllead compound from the reaction mass by steam distillation, the step which comprises conducting said steam distillation in the presence of from about 5 to about 25 weight percent each of a $C_8$ acyclic hydrocarbon selected from the group consisting of alkanes and alkenes, and of a $C_{10}$ acyclic hydrocarbon selected from the group consisting of alkanes and alkenes, the foregoing percentages being based upon the weight of said alkyllead compound.

3. A concentrated alkyllead compound with which has been blended from about 5 to about 25 weight percent each of a $C_8$ acyclic hydrocarbon selected from the group consisting of alkanes and alkenes, and of a $C_{10}$ acyclic hydrocarbon selected from the group consisting of alkanes and alkenes, the foregoing percentages being based upon the weight of said alkyllead compound.

4. The composition of claim 3 wherein at least one of said acyclic hydrocarbons is a straight chain hydrocarbon.

5. The composition of claim 3 wherein said alkyllead compound is selected from the group consisting of tetramethyllead, ethyltrimethyllead, diethyldimethyllead, triethylmethyllead, tetraethyllead, and mixtures thereof.

6. The composition of claim 3 wherein said alkyllead compound is tetraethyllead.

7. The composition of claim 3 wherein said $C_8$ hydrocarbon includes 2,2,4-trimethylpentane and said $C_{10}$ hydrocarbon includes n-decane.

No references cited.